United States Patent
Yan et al.

(10) Patent No.: US 11,934,459 B2
(45) Date of Patent: Mar. 19, 2024

(54) RIPPLE PUSH METHOD FOR GRAPH CUT

(71) Applicant: SHANGHAITECH UNIVERSITY, Shanghai (CN)

(72) Inventors: Guangyao Yan, Shanghai (CN); Xinzhe Liu, Shanghai (CN); Yajun Ha, Shanghai (CN); Hui Wang, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/799,278

(22) PCT Filed: Sep. 22, 2021

(86) PCT No.: PCT/CN2021/119510
§ 371 (c)(1),
(2) Date: Aug. 12, 2022

(87) PCT Pub. No.: WO2022/222368
PCT Pub. Date: Oct. 27, 2022

(65) Prior Publication Data
US 2023/0195793 A1    Jun. 22, 2023

(30) Foreign Application Priority Data
Apr. 20, 2021   (CN) .......................... 202110421737.0

(51) Int. Cl.
*G06T 7/162* (2017.01)
*G06F 16/901* (2019.01)
*G06T 7/13* (2017.01)

(52) U.S. Cl.
CPC ............ *G06F 16/9024* (2019.01); *G06T 7/13* (2017.01); *G06T 7/162* (2017.01); *G06T 2207/20072* (2013.01)

(58) Field of Classification Search
CPC . G06T 7/13; G06T 7/162; G06T 2207/20072; G06F 16/9024
See application file for complete search history.

(56) References Cited

U.S. PATENT DOCUMENTS 5,978,588 A * 11/1999 Wallace ................. G06F 8/445
717/159
2005/0183090 A1* 8/2005 Hunt ..................... G06F 9/5066
719/310

(Continued)

FOREIGN PATENT DOCUMENTS

CN      101271591 A    9/2008
CN      101493941 A    7/2009

(Continued)

OTHER PUBLICATIONS

Nagy. "The Maximum Flow Problem—A Real Time Approach." A Master of Science thesis, Queen's University, Kingston, Ontario, Canada, Jan. 2001, 121 pages (Year: 2001).*

(Continued)

*Primary Examiner* — Jon Chang
(74) *Attorney, Agent, or Firm* — Bayramoglu Law Offices LLC

(57) ABSTRACT

A ripple push method for a graph cut includes: obtaining an excess flow ef(v) of a current node v; traversing four edges connecting the current node v in top, bottom, left and right directions, and determining whether each of the four edges is a pushable edge; calculating, according to different weight functions, a maximum push value of each of the four edges by $ef_w=ef(v)*W$, where W denotes a weight function; and traversing the four edges, recording a pushable flow of each of the four edges, and pushing out a calculated flow. The ripple push method explores different push weight functions, and significantly improves the actual parallelism of the push-relabel algorithm.

2 Claims, 1 Drawing Sheet

Direct Push

Ripple Push

(56) References Cited

U.S. PATENT DOCUMENTS

2005/0213837 A1* 9/2005 Boykov .................. G06T 7/162
  382/253
2006/0291721 A1* 12/2006 Torr ..................... G06V 10/457
  382/173
2019/0180406 A1  6/2019 Yang et al.

FOREIGN PATENT DOCUMENTS

CN  101783028 A  7/2010
CN  113139978 A  7/2021

OTHER PUBLICATIONS

Ramirez et al. "A Volume Segmentation Approach Based on GrabCut." CLEI Electronic Journal, vol. 16, No. 2, paper 4, Aug. 2013, pp. 1-14 (Year: 2013).*
Yan et al. "Ultra-Fast FPGA Implementation of Graph Cut Algorithm With Ripple Push and Early Termination." IEEE Transactions on Circuits and Systems, I: Regular Papers, vol. 69, No. 4, Apr. 2022, pp. 1532-1545 (Year: 2022).*
Vibhav Vineet, et al., CUDA Cuts: Fast Graph Cuts on the GPU, IEEE, 2008.
Daichi Kobori, et al., An Acceleration of a Graph Cut Segmentation With FPGA, IEEE, 2012, pp. 407-413.
Tianqi Gao, et al., Toward a Pixel-Parallel Architecture for Graph Cuts Inference on FPGA, 2017.

* cited by examiner

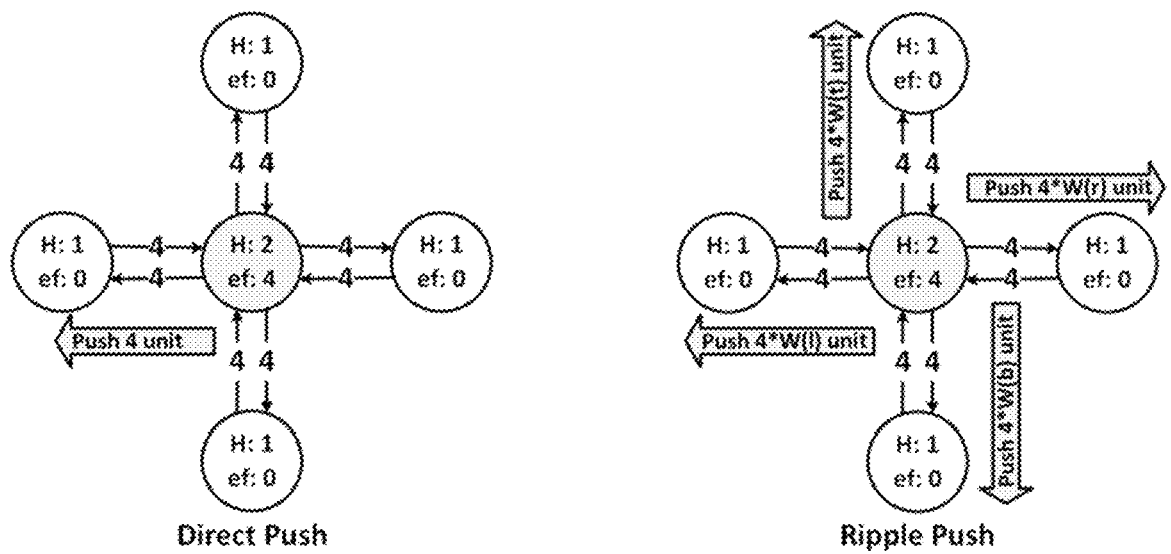

RIPPLE PUSH METHOD FOR GRAPH CUT

CROSS REFERENCE TO THE RELATED APPLICATIONS

This application is the national phase entry of International Application No. PCT/CN2021/119510, filed on Sep. 22, 2021, which is based upon and claims priority to Chinese Patent Application No. 202110421737.0, filed on Apr. 20, 2021, the entire contents of which are incorporated herein by reference.

TECHNICAL FIELD

The present invention relates to a ripple push method for a graph cut.

BACKGROUND

Graph cut is a method for solving the minimum cut problem, which is widely used but not limited to the field of computer vision technology. The push-relabel algorithm has become one of the most widely used graph cut algorithms due to its high parallelization potential. However, the existing implementations of the push-relabel algorithm often fail to fully exploit the parallelism available in the parallel architecture, and thus are not suitable for application scenarios with high resolution and real-time requirements.

There have been attempts to explore parallel implementations of the push-relabel algorithm on graphics processing units (GPUs) or field programmable gate arrays (FPGAs). A well-known compute unified device architecture (CUDA) cuts algorithm was proposed to implement the push-relabel algorithm in parallel on a GPU platform (V Vineet; P. Narayanan. *Cuda Cuts: Fast Graph Cuts on the GPU.* 2008 IEEE Computer Society Conference on Computer Vision and Pattern Recognition Workshops. IEEE. 2008: pp. 1-8). The algorithm adds a new operation phase called pull, so as to remove data dependencies in the push phase. An FPGA implementation with multiple parallel computing units was proposed (D. Kobori; T. Maruyama. *An Acceleration of A Graph Cut Segmentation with FPGA.* $22^{nd}$ International Conference on Field Programmable Logic and Applications (FPL). IEEE. 2012: pp. 407-413). In order to implement the push-relabel algorithm in a highly parallel manner, a pixel-parallel architecture was proposed (T. Gao; J. Choi; S. Tsai; R A Rutenbar. *Toward A Pixel-parallel Architecture for Graph Cuts Inference on FPGA.* 2017 $27^{th}$ International Conference on Field Programmable Logic and Applications (FPL). September 2017: pp. 1-4). It constructs a rectangular processor array and assigns each node a physical processor core. The processor array is capable of performing fully parallel push-relabel operations. Further, to eliminate the data dependency between $p_{ush}(u,v)$ and $p_{ush}(v,u)$, a checkerboard scheduling strategy was also proposed (T. Gao; J. Choi; S. Tsai; RA Rutenbar. *Toward A Pixel-parallel Architecture for Graph Cuts Inference on FPGA.* 2017 $27^{th}$ International Conference on Field Programmable Logic and Applications (FPL). September 2017: pp. 1-4). This strategy pushes the flow clockwise to neighboring nodes, while relabeling the neighboring nodes counterclockwise. The architecture has a very high parallelism potential, potentially operating all nodes simultaneously. The implementation thereof on the FPGA can solve a graph cut task of the size of 8*32 in 6 μs. However, if a node is inactive (its excess flow equals zero) for one cycle, the physical core assigned to it will be idle, which wastes the available hardware parallelism in the pixel-parallel architecture.

SUMMARY

The present invention aims to solve the technical problem that the existing implementations of the push-relabel algorithm often fail to fully exploit the parallelism available in the parallel architecture.

In order to solve the above technical problem, the present invention provides the following technical solution: a ripple push method for a graph cut. The ripple push method includes the following steps:

step 1: obtaining an excess flow ef(v) of a current node v;

step 2: traversing four edges connecting the current node v in four directions of top, bottom, left and right; determining whether each of the edges is a pushable edge; if a current edge $e_{v,u}$ connecting the current node v to a neighboring node u is a pushable edge, recording a capacity value $c(e_{v,u})$ of the current edge $e_{v,u}$; otherwise, recording the capacity value of the current edge $e_{v,u}$ as 0;

step 3: calculating, according to different weight functions, a maximum push value of each of the edges by $ef_w=ef(v)*W$, where W denotes a weight function;

step 4: traversing the four edges described in step 2; recording a pushable flow of each of the edges, and pushing out a calculated flow; simultaneously updating the capacity value of the current edge, the excess flow of the current node v, an excess flow of the neighboring node connected to the current node v through the current edge and a received flow of the neighboring node; and updating an edge connecting the neighboring node to the current node v; and for the current edge $e_{v,u}$ connecting the current node v to the neighboring node u:

expressing the pushable flow of the current edge $e_{v,u}$ as $f(e_{v,u})=\min(ef_w, c(e_{v,u}))$; pushing the calculated flow out; simultaneously updating the capacity value $c(e_{v,u})=c(e_{v,u})-f(e_{v,u})$ of the current edge $e_{v,u}$, the excess flow $ef(v)=ef(v)-f(e_{v,u})$ of the current node v, the excess flow $ef(u)=ef(u)+f(e_{v,u})$ of the neighboring node u and the received flow $f(e_{v,u})$ of the neighboring node u; and updating the capacity value of the edge $e_{u,v}$ connecting the neighboring node u to the current node v to $c(e_{u,v})=c(e_{u,v})+f(e_{v,u})$; and step 5: determining whether a current weight function W is a constant 1; if yes, ending the operation; otherwise returning to step 3; and repeating n times, setting the weight function W to 1, and returning to step 3.

Preferably, the weight function W is one of Average Push, Euler's Push and Inversely Push.

The present invention explores different push weight functions, and significantly improves the actual parallelism of the push-relabel algorithm. The present invention tests the technical solution on a Middlebury test set. Compared to the state-of-the-art method (T. Gao; J. Choi; S. Tsai; R A Rutenbar. *Toward A Pixel-parallel Architecture for Graph Cuts Inference on FPGA.* 2017 $27^{th}$ International Conference on Field Programmable Logic and Applications (FPL). September 2017: pp. 1-4), the ripple push method of the present invention can reduce the number of iterations for convergence to 24.8% and reduce the total time to 53.8%.

BRIEF DESCRIPTION OF THE DRAWINGS

FIGURE shows a comparison of direct push and ripple push.

DETAILED DESCRIPTION OF THE EMBODIMENTS

The present invention will be described in detail below with reference to specific embodiments. It should be understood that these embodiments are only intended to describe the present invention, rather than to limit the scope of the present invention. In addition, it should be understood that various changes and modifications may be made on the present invention by those skilled in the art after reading the content of the present invention, and these equivalent forms also fall within the scope defined by the appended claims of the present invention.

The present invention provides a ripple push method for a graph cut. The ripple push method includes the following technical contents:

A node in a two-dimensional (2D) grid graph G(V,E) is defined as $v_{x,y}$, where V denotes a set of nodes, and E denotes a set of edges. There are four edges e connecting the node $v_{x,y}$, which are respectively defined as $e_v^l=(v_{x,y}, v_{x-1,y})$, $e_v^t=(v_{x,y}, v_{x,y-1})$, $e_v^r=(v_{x,y}, v_{x+1,y})$ and $e_v^b=(v_{x,y}, v_{x,y+1})$. The superscripts l, t, r and b of the four edges e refer to the four directions of left, top, right and bottom respectively, and the subscript v of the edges e denotes the current node v. An excess flow of the current node v is denoted as ef(v), a height of the node is denoted as h(v), a capacity of the edge e is denoted as c(e), and a flow pushed to the edge e is denoted as f(e). A push operation Push(v,u) satisfies the following conditions:

1) The height of a neighboring node u of the node v satisfies h(v)=h(u)+1.
2) For the node v, ef(v)>0.
3) The edge $e_{v,u}$ between the node v and the node u satisfies $e_{v,u}$>0.

The algorithm includes the following steps:

Step 1: Obtain an excess flow ef(v) of a current node v.

Step 2: Traverse four edges connecting the current node v in four directions of top, bottom, left and right; determine whether each of the edges is a pushable edge; if a current edge $e_{v,u}$ connecting the current node v to a neighboring node u is a pushable edge, record a capacity value $c(e_{v,u})$ of the current edge e; otherwise, record the capacity value of the current edge e as 0.

Step 3: calculate, according to different weight functions, a maximum push value of each of the edges by $ef_w=ef(v)*W$, where W denotes a weight function.

Step 4: Traverse the four edges described in step 2; record a pushable flow of each of the edges, and push out the calculated flow; simultaneously update the capacity value of the current edge, the excess flow of the current node v, an excess flow of the neighboring node connected to the current node v through the current edge and a received flow of the neighboring node; and update an edge connecting the neighboring node to the current node v.

For the current edge $e_{v,u}$ connecting the current node v to the neighboring node u, the operation includes:

Express the pushable flow of the current edge $e_{v,u}$ as $f(e_{v,u})=\min(ef_w, c(e_{v,u}))$; push the calculated flow out; simultaneously update the capacity value $c(e_{v,u})=c(e_{v,u})-f(e_{v,u})$ of the current edge $e_{v,u}$, the excess flow $ef(v)=ef(v)-f(e_{v,u})$ of the current node v, the excess flow $ef(u)=ef(u)+f(e_{v,u})$ of the neighboring node u and the received flow $f(e_{v,u})$ of the neighboring node u; and update the capacity value of the edge connecting the neighboring node u to the current node v to $c(e_{u,v})=c(e_{u,v})+f(e_{v,u})$.

Step 5: Determine whether a current weight function W is a constant 1; if yes, end the operation; otherwise return to step 3; and repeat n times, set the weight function W to 1, and return to step 3.

The above algorithm shows a complete ripple push technique, which can integrate different push weight functions W, where the push weight $W: E \rightarrow \mathbb{R}^+$ may be:

Euler's Push $(W(e_v^i)=e^{-c(e_v^i)}/\Sigma_{k\in\{l,t,r,b\}}e^{-c(e_v^k)}$, where i denotes the four directions of left, top, right and bottom)

Inversely Push $(W(e_v^i)=\Sigma_{k\in\{l,t,r,b\}}^{k\neq i}c(e_v^k)/\Sigma_{k\in\{l,t,r,b\}}c(e_v^k))$ Average Push $(W(e_v^i)=1/4)$ Notes: When the weight W is equal to a constant 1, the ripple push method is degenerated into a direct push method.

As shown in FIGURE, when an intermediate node v wants to push a flow to four nodes nearby, the usual method (direct push) is to traverse the four nodes nearby in turn and push a maximum pushable flow. This method results in a limited push, i.e. a first node receives more flow (4 in the above FIGURE), and the remaining nodes receive less flow (0 in the above FIGURE). In the present invention, the ripple push method traverses the four nodes nearby, and evenly distributes the flow to the four nodes according to the value of the weight function. As shown in the FIGURE, the flow received by the left node is $4 \times W(e_v^l)$, the flow received by the top node is $4 \times W(e_v^t)$, the flow received by the right node is $4 \times W(e_v^r)$, and the flow received by the bottom node is $4 \times W(e_v^b)$. As a result, the nodes in the four directions all receive a certain amount of flow, thus avoiding the problem of directional local push.

The present invention may be implemented by an application specific integrated circuit (ASIC) or a field programmable gate array (FPGA), and may also be applied in a graphics processing unit (GPU) architecture.

What is claimed is:

1. A ripple push method for a graph cut implemented in an application specific integrated circuit (ASIC), a field programmable gate array (FPGA), or a graphic processing unit (GPU), the method, comprising the following steps:

step 1: obtaining, by the ASIC, FPGA, or GPU, an excess flow ef(v) of a current node v;

step 2: traversing, by the ASIC, FPGA, or GPU, four edges connecting the current node v in four directions of top, bottom, left and right; determining whether each of the four edges is a pushable edge; if a current edge $e_{v,u}$ connecting the current node v to a neighboring node u is a pushable edge, recording a capacity value $c(e_{v,u})$ of the current edge $e_{v,u}$; otherwise, recording the capacity value of the current edge $e_{v,u}$ as 0;

step 3: calculating, by the ASIC, FPGA, or GPU, according to different weight functions, a maximum push value of each of the four edges by $ef_w=ef(v)*W$, wherein W denotes a weight function;

step 4: traversing, by the ASIC, FPGA, or GPU, the four edges described in step 2; recording a pushable flow of each of the four edges, and pushing out a calculated flow; simultaneously updating the capacity value of the current edge, the excess flow of the current node v, an excess flow of the neighboring node connected to the current node v through the current edge and a received flow of the neighboring node; and updating an edge connecting the neighboring node to the current node v; and for the current edge $e_{v,u}$ connecting the current node v to the neighboring node u:

expressing the pushable flow of the current edge $e_{v,u}$ as $f(e_{v,u})=\min(ef_v, c(e_{v,u}))$; pushing the calculated flow out; simultaneously updating the capacity value $c(e_{v,u})=c(e_{v,u})-f(e_{v,u})$ of the current edge $e_{v,u}$, the excess flow $ef(v)=ef(v)-f(e_{v,u})$ of the current node v, the excess flow $ef(u)=ef(u)+f(e_{v,u})$ of the neighboring node u and the received flow $f(e_{v,u})$ of the neighboring node u; and updating the capacity value of the edge $e_{u,v}$ connecting the neighboring node u to the current node v to $c(e_{u,v})=c(e_{u,v})+f(e_{v,u})$; and step 5: determining, by the ASIC, FPGA, or GPU, whether a current weight function W is a constant 1; if yes, ending the operation; otherwise returning to step 3; and repeating n times, setting the weight function W to 1, and returning to step 3.

2. The ripple push method for the graph cut according to claim 1, wherein the weight function W is one of Average Push, Euler's Push and Inversely Push.

\* \* \* \* \*